United States Patent Office 3,591,648

Patented July 6, 1971

3,591,648

POLYCYCLIC POLYENE COMPOUNDS OBTAINED BY REACTING FULVENE DERIVATIVES AND DIENES, AND A METHOD OF PRODUCING SAME

Walter Marconi, Sebastiano Cesca, and Arnaldo Roggero, San Donato Milanese, Italy, assignors to Snam Progetti S.p.A., Milan, Italy No Drawing. Filed Mar. 11, 1968, Ser. No. 711,917
Claims priority, application Italy, Mar. 13, 1967, 13,637/67
Int. Cl. C07c *13/28*
U.S. Cl. 260—666 15 Claims

ABSTRACT OF THE DISCLOSURE

A process for the manufacture of orthocondensed polycyclic polyene condensation products which comprises condensing a conjugated diene compound and a fulvene derivative at a temperature between 100 to 250° C., the mole-ratio of diene/fulvene being at least one is disclosed.

The present invention relates to novel orthocondensed polycyclic polyene compounds.

The present invention relates also to a method of manufacturing polycyclic polyenes of this kind by reacting fulvene derivatives with dienes.

The invention thus relates both to novel products and to the manner of manufacture of novel, substituted, orthocondensed, polycyclic polyene compounds, or other similar compounds. These compounds are useful for example in the preparation of vulcanisable olefine terpolymers which can be employed as a third monomer used in small percentages to introduce into the polymer unsaturations which are effective in the succeeding vulcanising processes. As far as the method is concerned, it will be seen that the present invention relates to the novel application of a method which is known per se, to the condensation of reactive particles, in order to produce novel products which, as such, are of interest from the industrial point of view, or which can be useful in organic chemistry, when used in the form of their derivatives. In accordance with the present invention, in fact a derivative of fulvene is reacted with a conjugated diene compound so that one or more diene molecules form a ring at the fulvene nucleus, thus giving rise to a compound with a polycyclic nucleus. Suitable diene compounds in this context include butadiene, isoprene, dimethyl butadiene, pentadiene 1–3, phenyl butadiene, cyclopentadiene, chloroprene, cyanobutadiene, alkoxybutadiene. The fulvene derivative may be a monoalkyl, or a dialkyl fulvene, an alkylaryl fulvene, an aryl fulvene or a diaryl fulvene. It is also possible to employ as reactants, compounds with condensed nuclei, which have been produced during a first condensation stage, such as derivatives of tetrahydroindene with conjugated alkylidene substitutions. The condensation reaction is effected at a temperature between 100 and 250° C. It is also possible to work with the more volatile reactant under pressure, the reaction being carried out in a closed reaction chamber. For the remainder, as far as the other conditions of working are concerned, these will consist for example in employing reaction times of no less than one hour and in using molecular ratios of diolefine/fulvene, of no less than unity.

The reaction may be a solid-state one or can also be carried out in organic solvents. The reaction products can subsequently be isolated by rectification.

The present invention will be better understood from a consideration of the following non-limitative examples.

EXAMPLE 1

In a stainless steel autoclave, in which agitation is produced by rocking the system and which is equipped with electrical resistance heating, the existing air charge is expelled using nitrogen and after evacuation of the gas 2.95 mols of 6,6-dimethylfulvene are introduced. Then, 14.45 mols of butadiene are introduced and, agitation being carried out, the mixture is heated to 180° C. Once this temperature is reached, agitation is continued for 4 hours, and a progressive reduction in the initial pressure is observed. The autoclave is then brought back to the ambient temperature and discharged, producing 1148 g. of dark yellow liquid. Using a rectifying column operating at a low pressure, the reaction product is processed to produce 423 g. of 4-vinylcyclohexene-1 and then 420 g. of a central fraction which is shown by gas chromatographic techniques of analysis to contain 75% of a condensation product of butadiene and dimethylfulvene (68% yield). By means of subsequent fractionation at 10 mm./Hg carried out on 172 g. of the central fraction, it is possible to obtain 102 g. of 1 - isopropylidene-3a,4,7,7a-tetrahydroindene having a chromatographically determined purity of 99% (yield of 78% with respect to the post-rectification product) and exhibiting the following properties, viz. B.P.=105° C./10 mm./Hg $d_4^{25}=0.9437$, $n_D^{20}=1.5378$. Both elementary analysis and physicochemical investigations (NMR, mass spectrography and IR) confirm this structure.

EXAMPLE 2

If the method described in the preceding example is employed, with the sole difference that the mole ratio of butadiene to fulvene is around 3 and the reaction temperature 200° C., a reaction product can be obtained which, by gas-chromatographic analysis, can be shown to contain 48% of 1-isopropylidene-3a,4,7,7a-tetrahydroindene. By rectifying 1546 g. of this product, 573 g. of a central fraction are obtained, containing 63% of the derivative. By succeeding fractionation at 0.1 mm./Hg, carried out on 179 g. of the central fraction, 102 g. of a 98.5% pure product are obtained, having properties which accord with those of the product obtained in the foregoing example.

EXAMPLE 3

Into a 500 cm.³ autoclave which has previously been evacuated, 0.867 mol of 6,6-dimethylfulvene and 1.99 mols of isoprene, are introduced. The solution is agitated at 200° C. for 3 hours and 202 g. are distilled off, of a product which gas-chromatographic analysis shows to contain 42% of two products which have very similar retention times (56% yield). By rectification it is possible to extract 9.5 g. of a fraction which is found to contain 63% of the first component and 35% of the second; then, 5 additional fractions (totalling 49.2 g.) are obtained which are made up for 96% of the second component.

These fractions exhibit the following properties: B.P.=114° C./10 mm./Hg and $n_D^{20}$=1.5297. Elementary analysis and physicochemical evidence, show that the product isolated has the formula 5 or 6-methyl-1-isopropylidene-3a,4,7,7a-tetrahydroindene.

EXAMPLE 4

The procedure described in Example 1 is employed, 0.867 mol of 6,6-dimethylfulvene and 1.04 mols of 2,3-dimethylbutadiene being reacted for 3 hours at 200° C. By fractionation (rectification) of the reaction product, 36.5 g. (B.P.=116° C./5 mm./Hg) of a derivative having a chromatographically determined purity of 99.5% (yield 22%) are obtained, in which $n_D^{20}$=1.5233. The analyses carried out point to the following structure: 5,6-dimethyl-1-isopropylidene-3a,4,7,7a-tetrahydroindene.

EXAMPLE 5

Into a 500 cc. evacuated autoclave, 0.483 mol of 6,6-dimetyhlfulvene and 110 cc. of cyclopentadiene are introduced, and heated for 6 hours at 150° C. By rectification of the reaction product, 26.3 g. (91% purity) of 1-isopropylidene-dicyclopentadiene (30% yield) are obtained, having the folliwing characteristics: B.P.=64° C./0.1 mm./Hg and $n_D^{20}$=1.5442. The analyses carried out on the product obtained wherein agreement with the formula set out.

EXAMPLE 6

0.155 mol of 6-methylfulvene and 1.12 mols of butadiene, were reacted for 3 hours at 150° C. By distillation and rectification, a fraction was obtained which was subsequently purified by preparative chromatography and had a purity of 95%. The product obtained had the following characteristics: B.P.=105–115° C./20 mm./Hg, $n_D^{20}$=1.5346, and analyses confirmed that it was the 1-ethylidene derivative of tetrahydroindene.

EXAMPLE 7

0.32 mol of 6-methyl-6-ethylfulvene and 2.4 mols of butadiene were reacted at 150° C. for 9 hours. The product discharged from the autoclave was distilled and yielded 60 g. of a product containing 82% of the desired derivative (89% yield). By fractionation, 47 g. of 99% purity product was obtained, exhibiting the hollowing characteristics: B.P.=80° C./1 mm./Hg, $n_D^{20}$=1.5325. The analyses carried out on this fraction confirmed it to be the (1-ethyl)-1 ethylidene derivative of tetrahydroindene.

EXAMPLE 8

0.347 mol of 6,6-diethylfulvene and 1.67 mols of butadiene were reacted for 2 hours at 150° C. and it was possible to separate out by rectification 33 g. of a product having a 96% purity, exhibiting the following characteristics: B.P.=125° C./10 mm./Hg and $n_D^{20}$=1.5298. Analyses of this fraction indicated it to be (1-ethyl)-1-propylidene-3a,4,7,7a-tetrahydroindene.

EXAMPLE 9

Into an evacuated autoclave, 0.115 mol of 6,6-diisobutylfulvene and 1.11 mols of butadiene were introduced, then heated for 3 hours at 150° C. By rectification, 11 cc. of a 96% purity product were obtained, exhibiting the following characteristics: B.P.=92° C./0.1 mm./Hg, $n_D^{20}$=1.5140. Analyses showed the derivative obtained to be (1′-isobutyl)-1-isoamylidene-3*a*,4,7,7*a*-tetrahydroindene.

EXAMPLE 10

Using the conventional method, 0.201 mol of 6-phenylfulvene and 1.85 mols of butadiene were reacted at 150° C. for 10 hours. By rectification, 27 cc. of a product having a B.P. figure of 150° C./0.1 mm./Hg were obtained, the chromatographically determined purity being 95% and the $n_D^{20}$ figure being 1.6191. Analyses showed the product obtained to be 1-benzal-3a,4,7,7a-tetrahydroindene.

EXAMPLE 11

0.66 mol of 6-methyl-6-phenylfulvene and 2.4 mols of butadiene were introduced into an autoclave, and heated at 130° C. for 48 hours. After preliminary distillation, 108 cc. of a product having a B.P. figure of 124° C./0.1 mm./Hg were obtained, which chromatographic analysis showed to be made up for 27% of two products with very similar characteristics. Physicochemical investigations indicated these to be two isomeric products at the substitution positions and having a tetrahydroindene structure. Thus, in this case too a derivative stemming from the fulvene derivative and butadiene has been obtained.

EXAMPLE 12

0.503 mol of 1-isopropylidene-3a,4,7,7a-tetrahydroindene and 2.22 mols of butadiene were reacted at a temperature of 200° C. for 3 hours. By distillation, it was possible to obtain a fraction (12 cc.) having a B.P. of 100° C./0.2 mm./Hg containing 95% of a derivative with 16 carbon atoms (analysis by mass-spectrometer); $n_D^{20}$=1.5919. By more accurate chromatographic analysis, it was possible to determine that the fraction obtained was composed of two components, probably corresponding to 9-isopropylidene-4,4a,5,5a,8,8a,1a,1-octahydrofluorene and the corresponding isomer to 1H-isopropylidene-3a,4,4a,5,8,8a,9,9a-octahydro-benz-f]-indene.

What is claimed is:

1. A process for the manufacture of orthocondensed polycyclic polyene condensation products which comprises condensing a conjugated diene compound and a fulvene derivative selected from the group consisting of monoalkyl, dialkyl, monoaryl, diaryl and monoalkyl monoaryl fulvenes at a temperature between 100 to 250° C., the mole-ratio of diene/fulvene being at least one.

2. The process according to claim 1 wherein said diene compound is butadiene, isoprene, dimethylbutadiene, pentadiene-1,3-phenylbutadiene or cyclopentadiene.

3. The process according to claim 1 wherein said conjugated diene compound is butadiene and said fulvene derivative is 6,6-dimethyl fulvene.

4. The process according to claim 1 wherein said conjugated diene compound is isoprene and said fulvene derivative is 6,6-dimethyl fulvene.

5. The process according to claim 1 wherein said conjugated diene compound is 2,3-dimethylbutadiene and said fulvene is 6,6-dimethyl fulvene.

6. The process according to claim 1 wherein said conjugated diene compound is cyclopentadiene and said fulvene derivative is 6,6-dimethyl fulvene.

7. The process according to claim 1 wherein said conjugated diene compound is butadiene and wherein said fulvene derivative is 6-dimethyl fulvene.

8. The process according to claim 1 wherein said conjugated diene compound is butadiene and wherein said fulvene derivative is 6-methyl-6-ethyl fulvene.

9. The process according to claim 1 wherein said conjugated diene compound is butadiene and wherein said fulvene derivative is 6,6-diethylfulvene.

10. The process according to claim 1 wherein said conjugated diene compound is butadiene and wherein said fulvene derivative is 6,6-diisobutylfulvene.

11. The process according to claim 1 wherein said conjugated diene compound is butadiene and wherein said fulvene derivatives is 6-phenylfulvene.

12. The process according to claim 1 wherein said conjugated diene compound is butadiene and wherein said fulvene derivative is 6-methyl-6-phenylfulvene.

13. The process according to claim 1 wherein said conjugated diene compound is butadiene and wherein said fulvene derivative is 1-isopropylidene-3a,4,7,7a-tetrahydroindene.

14. The process according to claim 1 wherein said condensation is carried out under pressure.

15. A compound represented by the formula:

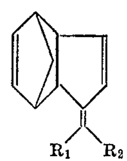

wherein $R_1$ is selected from the group consisting of H, alkyl and aryl, and $R_2$ is selected from the group consisting of alkyl and aryl.

References Cited

UNITED STATES PATENTS 3,407,239 10/1968 Cameli et al. -------- 260—666

OTHER REFERENCES

Chemical Abstracts, vol. 65, pp. 9141h–Za-c, 1966.
Chemical Abstracts, vol. 55, pp. 22253f–22254a-c, 1961.

DELBERT E. GANTZ, Primary Examiner
V. O'KEEFE, Assistant Examiner